US00RE36254E

United States Patent [19]

Newman

[11] E Patent Number: Re. 36,254

[45] Reissued Date of Patent: Jul. 20, 1999

[54] WATER PIPE

[76] Inventor: Mark R. Newman, P.O. Box 17009, Tucson, Ariz. 85731

[21] Appl. No.: 29/052,443

[22] Filed: Feb. 20, 1996

Related U.S. Patent Documents

Reissue of:

[64] Patent No.: Des. 346,673
Issued: May 3, 1994
Appl. No.: 29/012,447
Filed: Sep. 2, 1993

[51] LOC (6) Cl. ..... 27-02

[52] U.S. Cl. ..... D27/162

[58] Field of Search ..... D27/162; 131/173, 131/330

[56] References Cited

U.S. PATENT DOCUMENTS

| | | | |
|---|---|---|---|
| D. 249,070 | 8/1978 | Evans | D27/3 |
| D. 249,282 | 9/1978 | Nielsen | D27/3 |
| D. 265,555 | 7/1982 | Galanter | D27/3 |
| D. 265,595 | 7/1982 | Galanter | D27/162 |
| 3,881,499 | 5/1975 | McFadden et al. | 131/173 |
| 4,171,703 | 10/1979 | Locke | 131/173 |
| 4,203,455 | 5/1980 | Byrd, Jr. | 131/173 |
| 4,216,785 | 8/1980 | Erickson | 131/173 |

OTHER PUBLICATIONS

U.S. Bong No. 201, Acrylic Bongs Odessey Glass Catalog, Pipe Publication Box, Nov. 1977.

Odessy Glass Catalog, Nov. 1977, no page number, bong, item No. FT114 "Missle", located at left of page.

Odessey Glass Catalog, Nov. 1977, no page number, bong, item No. 201 located at right of page.

*Primary Examiner*—Susan J. Lucas
*Assistant Examiner*—Jennifer Rivard
*Attorney, Agent, or Firm*—LaRiviere, Grubman & Payne, LLP

[57] CLAIM

The ornamental design for a water pipe, as shown and described.

DESCRIPTION

Figure 1:
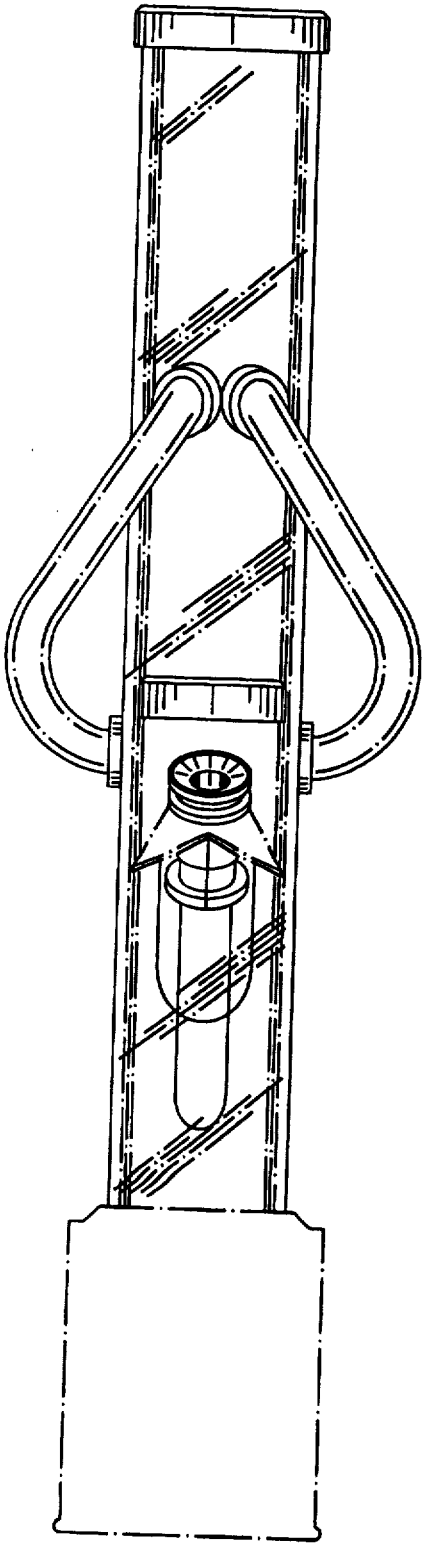
FIG. 1 is a front elevational view thereof the water pipe showing my design, *the broken lines are for purposes of illustration only and form no part of the invention*.
Figure 2:
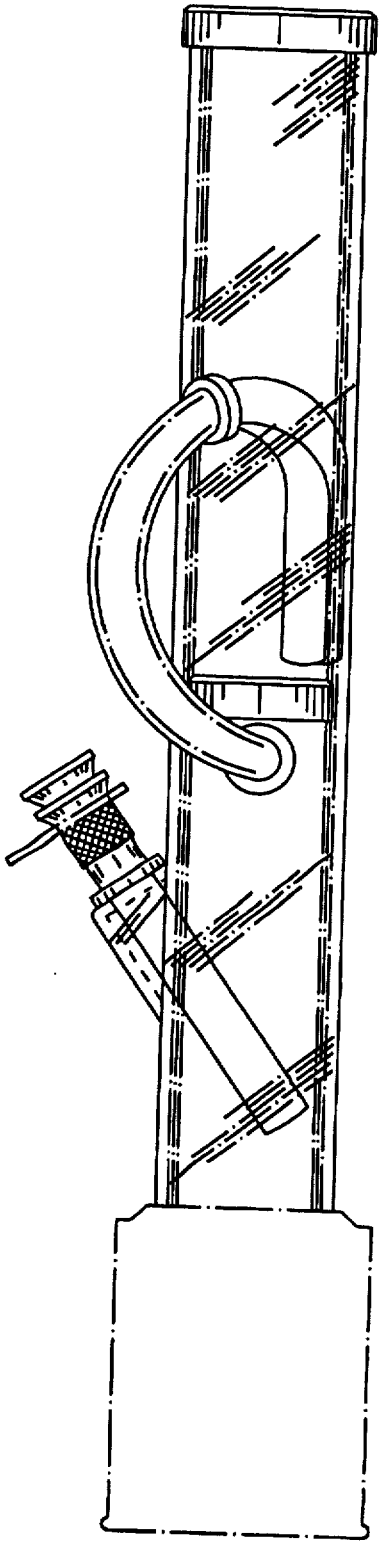
FIG. 2 is a right side elevational view thereof with the opposite side view being a mirror image thereof, *the broken lines are for purposes of illustration only and form no part of the invention*.
Figure 3:
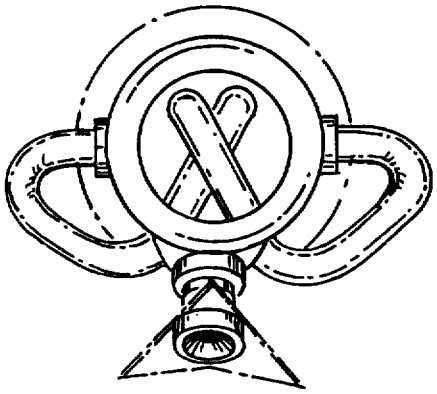
FIG. 3 is a top plan view thereof, *the broken lines are for purposes of illustration only and form no part of the invention*; and, FIG. 4 is a perspective view thereof, *the broken lines are for purposes of illustration only and form no part of the invention*.
Figure 4:
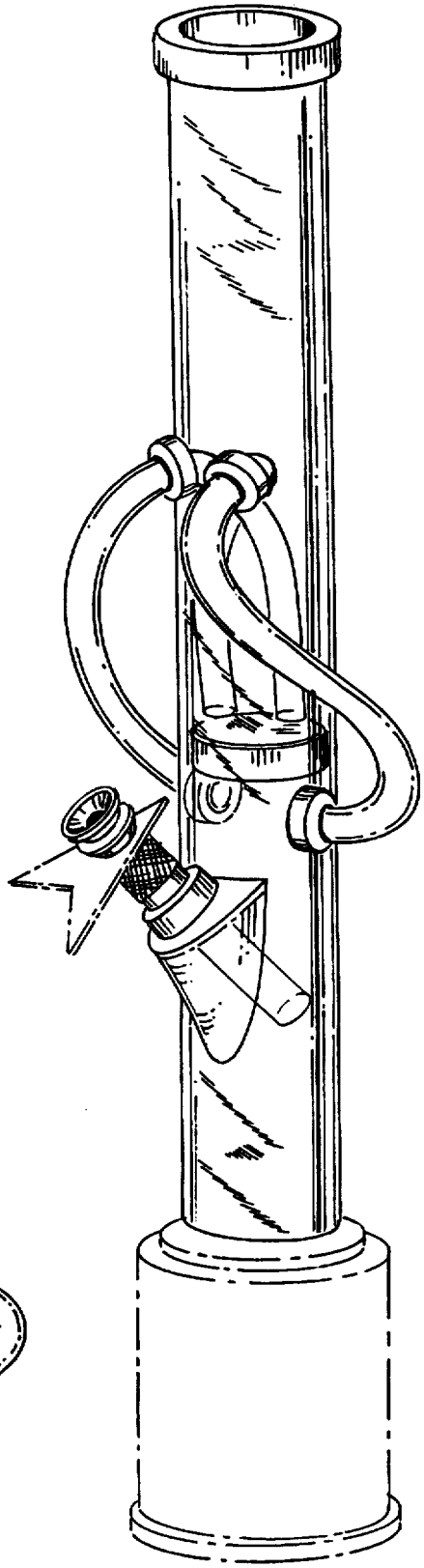

The undisclosed bottom and rear views are unornamented.

1 Claim, 2 Drawing Sheets

Matter enclosed in heavy brackets [ ] appears in the original patent, but forms no part of this reissue; matter printed in italics indicates the additions made by reissue.